US007632423B2

(12) United States Patent
Halahmi et al.

(10) Patent No.: US 7,632,423 B2
(45) Date of Patent: Dec. 15, 2009

(54) REACTIVE FINE PARTICLES

(75) Inventors: Izhar Halahmi, Hod Hasharon (IL); Jacob Mozel, Kfar Saba (IL); Ran Vilk, Kiron (IL)

(73) Assignee: Printar Ltd., Rehovot (IL)

( * ) Notice: Subject to any disclaimer, the term of this patent is extended or adjusted under 35 U.S.C. 154(b) by 0 days.

(21) Appl. No.: 11/757,175

(22) Filed: Jun. 1, 2007

(65) Prior Publication Data

US 2007/0246686 A1 Oct. 25, 2007

Related U.S. Application Data

(62) Division of application No. 10/762,508, filed on Jan. 23, 2004, now Pat. No. 7,485,242.

(51) Int. Cl.

*C09K 3/00* (2006.01)
*C08G 59/50* (2006.01)
*C08G 59/56* (2006.01)
*C08L 63/00* (2006.01)

(52) U.S. Cl. ............................ 252/182.13; 252/182.14; 252/182.26; 252/182.29; 252/182.32; 523/400; 523/402; 523/414; 523/440

(58) Field of Classification Search ............. 252/182.13
See application file for complete search history.

(56) References Cited

U.S. PATENT DOCUMENTS 3,288,747 A * 11/1966 Sussman ..................... 523/200
3,335,112 A 8/1967 Marks
3,485,917 A * 12/1969 Van Der Eijcken ......... 514/400
3,876,604 A 4/1975 Caruso et al.
5,009,982 A * 4/1991 Kamayachi et al. ...... 430/280.1
5,478,885 A 12/1995 Masse et al.
5,480,957 A 1/1996 Muroi et al.
5,702,820 A * 12/1997 Yokoshima et al. ......... 428/413
6,210,862 B1 4/2001 Day et al.
6,235,865 B1 5/2001 Shimizu et al.
6,319,652 B1 11/2001 Akutsu et al.
6,432,612 B1 * 8/2002 Hamada et al. .......... 430/280.1
6,492,437 B1 12/2002 Musa et al.
6,822,341 B1 * 11/2004 Ahsan ........................ 257/793
7,485,242 B2 2/2009 Halahmi et al.
2004/0230008 A1 * 11/2004 Correll et al. ............ 525/326.2
2006/0047014 A1 3/2006 Hopper et al.
2007/0246686 A1 10/2007 Halahmi et al.

* cited by examiner

*Primary Examiner*—Joseph D Anthony
(74) *Attorney, Agent, or Firm*—Pearl Cohen Zedek Latzer, LLP

(57) ABSTRACT

A reactive fine particle includes one or more functional compounds A or its precursors having a maximal size of less than 2 microns, adapted for synthesis, modification, curing, cross-linking, secession and/or initiating of polymerization of polymers; and one or more inert particles B having at least the maximal size of 2 microns and carrying said functional compounds A at its outer surface and/or in its inner portion. The compounds A to inert particles B weight ratio is ranging from 0.01A:100B to 50A:100B.

21 Claims, 2 Drawing Sheets

2

1

REACTIVE FINE PARTICLES

RELATED APPLICATIONS

Figure 1:
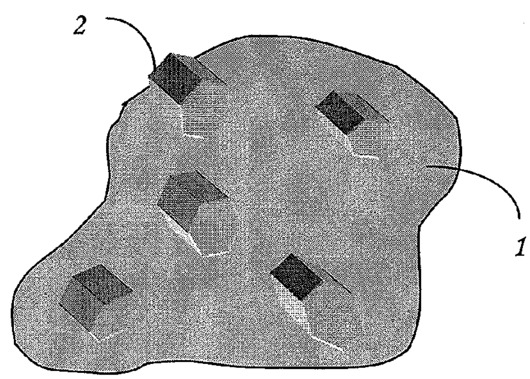

This application is a divisional of U.S. patent application Ser. No. 10/762,508 filed Jan. 23, 2004, now U.S. Pat. No. 7,485,242.

FIELD OF THE INVENTION

The present invention generally relates to reactive fine particles and especially to fine latent curing agents; to a method for their production and to any use or end product comprising said novel particles or said method.

BACKGROUND OF THE INVENTION

Latent curing agents are solid low molecular weight chemicals that are dispersed in monomers, oligomers and polymers or mixtures thereof. Those chemicals are practically inactive at ambient temperature and become active at elevated temperatures. When activated, the dispersed solid particles of latent curing agent melt and react or initiate polymerization with polymers to form a cross-linked polymeric network.

A thermoset polymer is a polymer that doesn't melt when heated. The typical latent curing agents in thermosets, especially in epoxy systems, are solid fine powders that are dissolved in the epoxy matrix only above critical temperatures.

Epoxy based thermosets are cost effective matrices known for their low viscosity, excellent chemical and thermal properties, cost effectiveness, excellent adhesion to metals, ceramics and plastics, ease of application, low toxicity, wide spectrum of resins, diluents, modifiers and curing agents. The most popular epoxy resins for high performance applications are Diglycidyl ethers of bisphenol A (hereinafter 'DGEBA'), epoxy phenol Novolacs (hereinafter 'EPN'), epoxy cresol Novolacs (hereinafter 'ECN'), Diglycidyl ethers of bisphenol F (hereinafter 'DGEBF'), and bisphenol A based Novolacs.

Epoxy is the major building block of most high-end adhesives, legend marking inks, solder masks and hole plugging pastes. The most common latent curing agent for epoxy resins are urea derivatives, imidazoles, modified amines, and dicyandiamide (hereinafter 'DICY'), which is a commercially available ingredient in high-end electronic applications, such as adhesives, PCBs manufacturing, solder masks and hole plugging inks. DICY is characterized by a significant latency (pot life) and outstanding final properties of the cured matrix. It is activated at temperatures in the range of 160-170° C. without a catalyst and in the range of 120 to 150° C. with catalyst. The catalyst usually has negative impact on a pot life of the mixed formula.

Ink jet technology enables a very precise digital printing and provides for relatively small dots of liquid or molten material. Digital printing of high performance polymers adapted for marking, protection, coating, encapsulation and definition in electronic manufacturing has become a reality in recent years. The aforementioned ink is characterized by a low viscosity, less than 15 Cp at jetting temperature. When solid particles are used, their maximal size must be sub-micron, preferably less than 700 nm. These particles are usually selected from fillers, pigments, curing agents, rheology modifiers and matting agents. Thermoset ink-jet inks, and particularly epoxy-containing ink-jet ink are latent high performance latent resins and particularly epoxy-containing particles of latent curing agent such DICY. Nevertheless, the finest commercially available DICY powders are characterized by an average particle size of 4 to 6 micron, thus their use in ink-jet application is avoided. A sub-micron latent curing agent is hence a critical component for high performance digital printing inks and its commercial availability as a long felt need.

BRIEF DESCRIPTION OF THE INVENTION

Figures 2, 3, 4:
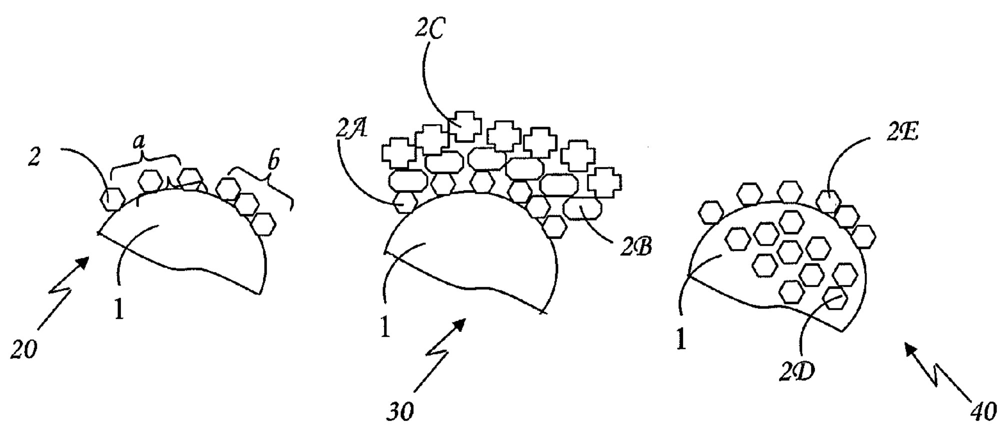
Figure 5:
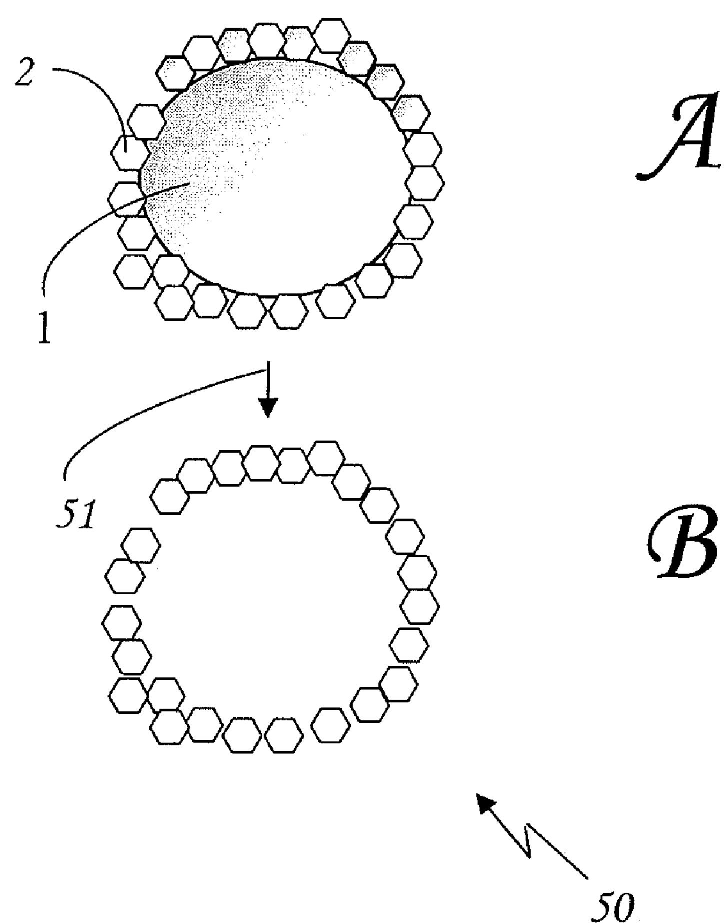

In order to understand the invention and to see how it may be implemented in practice, a plurality of embodiments shall now be described, in a non-limiting manner only, with reference to the accompanying drawings, in which FIG. 1 schematically illustrates a top view of a portion of the reactive fine particle according to one embodiment of the present invention;

FIG. 2 schematically illustrates a lateral cross section of a portion of the reactive fine particle according to said embodiment of the present invention;

FIG. 3 schematically illustrates a lateral cross section of a portion of the reactive fine particle according to yet another embodiment of the present invention, wherein a multi-laminar heterogamous coating is provided;

FIG. 4 schematically illustrates a lateral cross section of a portion of the reactive fine particle according to another embodiment of the present invention wherein the reactive particles are located in the inner and the outer portion of the inert particle; and FIG. 5 schematically illustrates a lateral cross section of a reactive fine particle according to another embodiment of the present invention, wherein at step A is comprises a physical support of the inert particle, and at the subsequent step B is comprises only the reactive particles.

SUMMARY OF THE INVENTION

It is hence the object of the present invention to provide a cost effective and novel reactive fine particle; comprising one or more functional compounds A or its precursors having a maximal size lower 2 microns; adapted for synthesis, modification, curing, cross-linking, secession and/or initiating of polymerizations of polymers, and one or more inert particles B having a maximal size lower 2 microns carrying said functional compounds A at the outer surface and/or in its inner portion; wherein said compounds A to inert particles B weight ratio is ranging from 0.01A:100B to 50A:100B.

According to one embodiment of the present invention, the aforementioned reactive fine particle defined above are adapted for curing thermosetic polymers; wherein at least a portion of the functional compounds are curing agents or latent curing agents adapted to initiate cross linking and/or polymerization said thermoset polymers.

According to yet another embodiment of the present invention, a liquid thermosetting compound is hereto provided, and is adapted to be cured by the curing agents as defined above. This liquid thermosetting compound is comprised of the reactive fine particles A, inert particles B and various compounds selected in a non-limiting manner from thermosetting resins, thermoplastic resins, nano-particles, wetting agents, reactive diluents, impact modifiers, flexibilizers, heat stabilizers, surface tension modifiers, adhesion promoter, flame retardants, matting agents, rheology modifiers, dispersants or any combination thereof.

It is in the scope of the present invention wherein the aforementioned liquid thermosetting compound is further adapted for applications in microelectronic devices manufacturing selected from dielectrics, resistors, optical waveguides, conductive modules, capacitance layers, adhesives, protective coatings, encapsulants or any combination thereof. It is also in the scope of the present invention wherein the aforementioned liquid thermosetting compound is adapted for ink jet inks and/or ink jet printers; characterized by a viscosity lower 50 Cp at application temperature, surface tension lower 80 dyn/cm at application temperature, and glass transition temperature of cured ink of greater than 120° C. The liquid thermosetting is preferably adapted to protect, mark, seal, encapsulate, define, and/or insulate electronic circuits from their environment and/or form aggressive media. More specifically, this liquid thermosetting compound according to yet another embodiment of the present invention is adapted to bond electronic, electric, optic and/or electro optic devices; to mark and notate features on the outer layers of PCB and/or the surface of discrete compounds; to define the feature of capacitors, resistors and/or conductors on a PCB layer.

It is a second object of the present invention to provide a cost effective and novel method for producing reactive fine particles as defined in any of the above. This method comprising inter alia the steps of (a) dissolving one or more functional compounds A or its precursors having a maximal size lower 2 microns in a solvent to form a clear solution; (b) admixing one or more inert particles B having a maximal size lower 2 microns with the solution obtained above to form a homogenized dispersion; (c) precipitating said functional compounds as a layer or in the form of small crystals onto and/or into the surface of said inert particles; (d) evaporating said solvent; (e) drying or concentrating the same; in the manner that reactive fine particles comprising said compounds A and inert particles B in a weight ratio which is ranging from 0.01A:100B to 50A:100B is obtained.

According to one embodiment of the present invention, the aforementioned method is provided wherein the deposition of the functional compounds A onto the inert particles B is provided by means selected from introducing of at least one another solvent to the said admixture; changing the temperature; pH shifting; altering electrolytes concentration, spraying agent solution on filler particles, or any combination thereof.

Additionally or alternatively, this method is additionally comprised of the step of stabilizing the obtained slurry by means of admixing a sufficient measure of dispersing agents and/or rheology modifiers. Moreover, this method is also provided useful wherein at least a portion of the precursors of the functional compounds A are admixed with the inert particles B at the reaction medium.

According to another embodiment of the present invention, the aforementioned method is provided for producing reactive fine particles, wherein the inert particles B are coated in at least a significant portion of their surface with functional compounds A. This method comprising inter alia the steps of (a) admixing at least one functional compound or its precursors in a solvent to form a clear solution; (b) spraying the same towards particles of the inert filler, having maximal particle size of 2 microns; and then, (c) removing said solvent, in the manner that reactive fine particles comprising dried inert particles coated by functional compounds is obtained. The method is also applicable wherein the reactive fine particles obtained comprising homogeneous or heterogeneous functional compounds compositions; and/or wherein monolayers or multilayers of functional compounds characterize the reactive fine particles obtained.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide sub micron reactive particles, a method for their production and any use or end product comprising said novel particles or said method.

The term 'fine particle' is referring according to the preset invention to any small particle; compound, matrix or a composition encapsulated, barriered, crystallized or packed in a predetermined 3D environment characterized by an Maximal external diameter lower 2 micrometer. More practically the powder should have maximal aggregate (conglomerate) size of 700 nm.

The term 'reactive fine particle' is referring according to the preset invention to fine particle, either prime particle or aggregate or agglomerate as defined above, comprising at least one type of inert particle (hereinafter 'B') and at least type of functional component (hereinafter 'A'), wherein the maximal size of said particle is less than 2 micrometer (e.g., between 200 to 2000 nm). Component A is in physical communication with said inert particle B. It is further in the scope of the present invention wherein said reactive fine particle is comprised of various types of functional components (As) and inert particles (Bs), differ by their size, 3D structure, surface activity, reactivity, latency property, chemical composition, specific area or any other physical, chemical or biological properties. It is further in the scope of the present invention wherein said functional components (As) are only temporary comprised of at least a portion of the inert particles (Bs), in the manner the content of the said inert particles in the end product is significantly lower than its content at the beginning of the production process. It is still in the scope of the present invention wherein the nature of the said portion of inert particles is differing, altering or changing along the said production process.

According to the present invention, the term 'polymer' is refereeing hereinafter to any monomer, oligomer or polymer, their mixture, or to any combination thereof. Moreover, this term is also referring to block polymers, co-polymers and to all product and by-products of polymerization reactions.

According to one embodiment of the present invention, the aforementioned fine particles are comprised of at least one inert particle B that is either inorganic material, e.g., comprising mineral metal oxides, mineral natural fillers, synthetic metal oxides, ceramics, metallic compositions, glass or sol-gel matrices, chemical element or any mixture thereof, or organic material, such as cellulose, natural polymer, synthetic polymer or any mixture thereof. The said fine powder B is characterized by a specific surface area ranges from about 1 to 300 $m^2/g$. According to yet another embodiment of the present invention, said powder is characterized by a specific surface area ranges from about 10 to about 50 $m^2/g$.

The said fine particles may further comprised of at least one latent reactive composition A (e.g., a solid latent curing agent) which is dissolved in the solution in a weight ratio ranging from 0.01A to 100B; to 50A to 100B. According to yet another embodiment of the present invention, the said ratio is ranging form 5A to 100B; to 40A to 100B. It is acknowledged in this respect that additives of any type are potentially comprised in the said particle. Hence, presence of commercially available dispersing agents and rheology controlling agents is recommended to avoid agglomeration during concentration and storage.

The carrier inert particle B may be selected in a non-limiting manner form one or more of the following criteria:

having a specific surface area between 1 to 300 $m^2/g$., wherein the most favorable powder is the one characterized by a specific surface area ranging between 10 and 50 $m^2/g$; since it is non-abrasive, and hence avoid damage to application tooling, especially to an ink-jet print head. Moreover, the carrier is preferably non-corrosive; it has a good thermal stability and chemical resistance; it is not reacting with the reactive particle and with the monomers, oligomers, polymers, solvents and/or additives in the ink. The inert particle B is further of sub-micron prime particle size, most favorably between 0.03 to 0.5 micron mean diameter; the maximal agglomerate size is 2 micron. It does not tend to deagglomerate or to disintegrate under milling; and/or it has a good compatibility with the monomers, oligomers, polymers, solvents and additives in the ink. Typical powders that meet these criteria are sulfates, e.g., $BaSO_4$ or $CaSO_4$, carbonates such as $CaCO_3$, talc, kaolin, mica, silicates, and carbon black and synthetic silica.

The carrier medium is optimized for effectively dissolving the functional component A and is selected in a non-limiting manner form one or more of the following criteria: it is not toxic or is characterized by a very low toxicity; it is cost effective since it is at least partially re-usable and/or recycled-able; it is a good solvent for the reactive latent curing agent id present; it has a low boiling point and a low specific heat of evaporation; and further, it is practically non reactive with either the inert or the reactive particles.

Reference is made now to FIG. 1, presenting a simplified top view reactive fine particles according to the present invention, wherein an relatively large inert particle B (1) is coated by a plurality of functional component A (see 2 for example). Said functional component (2) was crystallized on top the inert particle (1) and is characterized by a specific, defined and relative crystal 3D structure.

Reference is made now to FIG. 2, presenting a lateral cross-section of one portion of homogeneously coated reactive fine particle (20). Said portion comprising a central inert particle (1) and a plurality of functional components (see 2 for example). Said functional components may by either homogenous or heterogeneous nature, morphology or size, and may be set as an individual crystalline (portion a) or may be attached physically or chemically one to the others so a thin coating is provided (portion b).

Reference is made now to FIG. 3, presenting a lateral cross-section of one portion of heterogeneously coated reactive fine particle (30). Said portion comprising a central inert particle (1) and a plurality of functional components of type 2A (first and internal coating layer), type 2B (second coating layer) and type 2C (third and external coating layer). It is in the scope of the present invention wherein such a heterogeneous system is arranged as a plurality of layers in the manner at least one layer is homogeneous; a conglomerate comprising two or more types of reactive particles or any combination or mixture thereof.

Here, the three coating layer perform a contentious multi-component layer. Nevertheless, a porosive or other discontinuous layered or embedded structures are easily to be tailor made according to the description of the present invention.

Reference is made now to FIG. 4, presenting a lateral cross-section of one portion of homogeneously embedded reactive fine particle (40). Said portion comprising a central inert particle (1) and a plurality of functional components, some are entrapped, immobilized, encapsulated, soaked, doped or bonded into the inner portion of the inert particle (2D); and some are coated on the outer rim of the inert particle (2E). A reactive fine particle incorporating either homogenous or heterogeneous systems located in the inner portion, outer portion or a combination thereof is also possible according to the description of the present invention Reference is made now to FIG. 5, presenting a lateral cross-section of one portion of homogeneously coated reactive fine particle (50). Illustration 5A presents the said portion, wherein it is initially comprised of a central inert particle (1) and a plurality of functional components (see 2 for example). Illustration 5B however presents the said portion, whereat the inert particle is removed (51) in he manner it is currently comprised of the thin layer of the functional components. The removal of the said inert particle (1) in step (51) is provided by many known techniques of the art, such as physical treatments (temperature change, UV emission, sonication etc.), chemical reactions (pH shifting in the manner solubility is altered, oxidation, liquid-liquid extraction, etc), controlled biological response etc. Such a vehicle-like vesicle may be further processed in any manner.

It is well acknowledged in this respect that the precursors of the reactive fine particles are being admixed with the filler at the reaction medium and not the reactive fine particles themselves. Reference for that is made by U.S. Pat. No. 6,235,865 to Shimizu et al., which discloses phosphonium borate compounds useful as a curing catalyst in epoxy and other resin compositions, and U.S. Pat. No. 6,492,437 to Musa et al., which teaches for solvent-based processes for producing latent curing catalysts without causing an extreme exotherm.

It is in the scope of the present invention to provide a useful method for the production of the reactive fine particles A as defined in any of the above. Hence, the general approach for the production of the reactive fine particles according to the present invention is a simple process comprised inter alia of the following five steps: (a) dissolving at least one reactive fine particles or its precursors, characterized by fine particles, in a solvent to form a clear solution; (b) admixing an inert filler B having maximal particle size of 2 microns with the solution obtained above to form a homogenized dispersion; (c) precipitating said reactive fine particles as a layer or in the form of small crystals onto said filler surface and/or inside the internal porosity of said filler; (d) evaporating said solvent; and lastly, (e) drying or concentrating the same.

Additionally, a method for producing coated filler particles is hereto provided. Those filler particles B are coated the reactive fine particles A in at least a significant portion of their surface. Said method comprising inter alia the steps of admixing at least one reactive fine particle or its precursors in a solvent to form a clear solution, and then spraying the same towards particles of the inert filler, having maximal particle size of 2 microns. After removing said solvent, dried coated filler is obtained. The spraying is referring for any applicable means for jetting components A over components B, such as using an atomizer and a stream of hot carrier of air or gas.

It is in the scope of the present invention wherein sprayed suspension or solution comprising the reactive fine particle A or its precursors is sprayed onto a stream of B powder so a 0.01A:100B to 50A:100B coated dispersion is provided.

It is further acknowledged in this respect that since the surface area the inert particle B is high and the amount of the functional component A is limited, crystals or films of functional component A are small or thin so crystallization of particles to a non-desired big size is effectively limited.

The presence of organic dispersant (e.g., dispersing agent), assures that the particles are covered by a layer that minimize the tendency to re-agglomerate. The powder or slurry is then milled in pearl mill, sand mill or attritor in the presence of additional amount of dispersing agent to a smooth paste, so a fine particles are obtained, such as fine particles carrying a latent curing agents. Polymer resin (epoxy for example), and rheology modifier (e.g., fumed silica) can be incorporated in order to control rheology and prevent re-agglomeration.

It is in the scope of the present invention wherein the reactive fine particles as defined in any of the above are applicable in the various electronic technologies, especially for electronic and/or microelectronic and/or optical components or devices manufacturing processes suitable to be applied by ink jet technology. More specifically, the electronic technologies defined above may be selected from solder masks, dielectrics, resistors, optical waveguides, conductive modules, capacitance layers, adhesives, protective coatings, encapsulants or any combination thereof.

EXAMPLE 1

To prepare reactive fine particles useful as latent curing agents, the following formulation was prepared. The following ingredient where effectively admixed: 6 parts EPN (EEW=174); 24 parts DGEBF (EEW=170); 5 parts acrylated oligomers having functionality of 1 and viscosity of 5 Cp; 3 parts acrylated oligomer having functionality of 2; 3 parts of acrylated oligomer with functionality of 3; one part acrylated epoxy; 4 parts free radical photinitiator; 9 parts $BaSO_4$ inert filler having particle size of 40 nm and surface area of 30 $m^2/g$; 5 parts of dispersant; 0.2 parts organic peroxide; 25 parts glycol ether solvents mixture; 2.5 parts micronized DICY having average article size of 6 microns; 8 parts of melamine formaldehyde (MF) resin; 0.5 parts of wetting agents. The formulation was milled in pearl mill to disperse the solids. Ink jet ink was prepared from the same.

EXAMPLE 2

To enable continuous filtration of the ink obtained above, as required in industrial ink jet machines and enable introducing into the print head, a process of deposition of DICY on particles smaller than 2 μm was developed. DICY was slowly precipitated onto $BaSO_4$ fine particles from saturated organic or aqueous solution, and stabilized by reology additives and dispersant. The obtained slurry was milled with epoxy resins, dispersants and solvents to form an ink precursor. The resins and dispersant keep the rheology in a state that blocks re-agglomeration and DICY crystals growth. Milling was performed in a Dyno Mill, (Bead size 0.4 mm, 2000 RPM, Retention time of about 12 minutes), until this low viscosity concentrate could be easily filtered through 2 μm glass fiber filter.

The invention claimed is:

1. A method for producing reactive fine particles, comprising:

dissolving at least one latent curing agent selected from the group consisting of a urea derivative, an imidazole, a dicyandiamide (DICY), a mixture of any one or more thereof, and a precursor thereof, in at least one solvent to form a curing agent solution; and providing at least one inorganic inert particle comprising one or more members selected form the group consisting of a metal oxide, a mineral filler, a natural filler, and a mixture of any one or more thereof, the at least one inorganic inert particle having a specific surface area in the range of about 10 to about 50 $m^2/g$; and precipitating the at least one latent curing agent onto the at least one inorganic inert particle to form reactive fine particles having a maximal particle size of less than 2 microns;

wherein the at least one latent curing agent is entrapped, immobilized, encapsulated, soaked, doped or bonded into the inner portion of the at least one inorganic inert particle or the at least one latent curing agent is coated on the outer surface of the at least one inorganic inert particle, and a weight ratio of the at least one latent curing agent to the at least one inorganic inert particle is in a range of 0.01:100 to 50:100.

2. The method according to claim 1, wherein the at least one latent curing agent is configured to initiate cross-linking and/or polymerization of thermoset polymers.

3. The method according to claim 1, wherein the at least one latent curing agent is DICY.

4. The method according to claim 1, wherein the at least one inorganic inert particle comprise barium sulfate.

5. The method according to claim 1, wherein the at least one latent curing agent prior to dissolving is in crystalline form.

6. The method according to claim 1, wherein the reactive fine particles comprise an inorganic inert particle core coated by the at least one latent curing agent.

7. The method according to claim 1, wherein the at least one inorganic inert particle is formed from at least one of $BaSO_4$ (barium sulfate), $CaSO_4$, $CaCO_3$, talc, kaolin, mica, and glass.

8. The method according to claim 1, wherein at least one latent curing agent is activated at temperatures above 120° C.

9. The method according to claim 1, further comprising after providing, mixing the latent curing agent solution with the at least one inorganic inert particle to form an admixture.

10. The method according to claim 9, wherein precipitating comprises at least one of introducing at least one other solvent into the admixture;
changing a temperature of the admixture;
adjusting a pH of the admixture;
adjusting an electrolyte concentration of the admixture; or
a combination of any one or more thereof.

11. The method according to claim 1, wherein precipitating comprises spraying the latent curing agent solution onto the at least one inorganic inert particle.

12. The method according to claim 1, further comprising after precipitating evaporating the at least one solvent.

13. The method according to claim 10, further comprising after precipitating drying or concentrating the solution to form the solid reactive fine particles.

14. The method according to claim 1, wherein precipitating comprises depositing the at least one curing agent as crystals.

15. The method according to claim 9, wherein mixing further comprises adding at least one of a dispersing agent and a rheology modifier in an amount sufficient to stabilize the admixture.

16. The method according to claim 1, wherein the at least one latent curing agent is activated at temperatures above 100° C.

17. A method for forming a liquid thermosetting ink, comprising:

forming reactive fine particles according to the method of claim 1; and mixing the reactive fine particles with at least one epoxy based thermoset under conditions suitable to form the liquid thermosetting ink.

18. The method according to claim 17, wherein mixing further comprises adding at least one component selected from the group consisting of nano-particles, a wetting agent, a reactive diluent, an implant modifier, a flexibilizer, a heat stabilizer, a surface tension modifier, an adhesion promoter, a flame retardant, a matting agent, a rheology modifier, a dispersant, and any combination of one or more thereof, to the reactive fine particles and the at least one epoxy based thermoset.

19. The method according to claim 18, further comprising after mixing, one or more of deagglomerating, milling or pulverizing.

20. The method according to claim 18, wherein the at least one epoxy based thermoset is selected from the group consisting of an epoxy phenol novolac (EPN), an epoxy cresol novolac (ECN), a diglycidyl ether of bisphenol F (DGEBF), a diglycidyl ether of bispenol A (DGEBA), a commercially available bisphenol A based novolak product, and a mixture of any one or more thereof.

21. The method according to claim 18, further comprising filtering the liquid thermosetting ink through a 2-micron or less bore filter to form a liquid thermosetting filtered ink.

* * * * *